Jan. 15, 1924.
H. P. RHODES
1,481,226
STORAGE BATTERY OR ACCUMULATOR
Filed Oct. 5, 1922    2 Sheets-Sheet 2
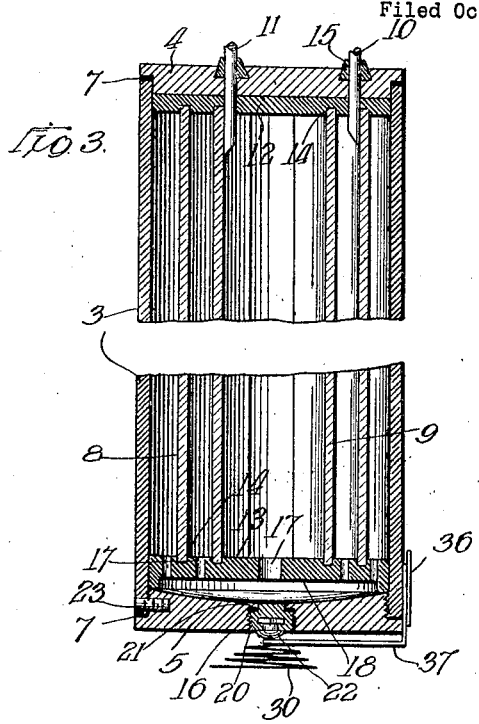
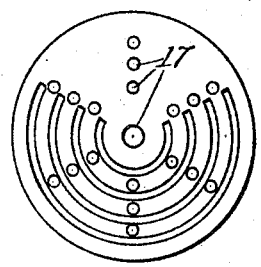
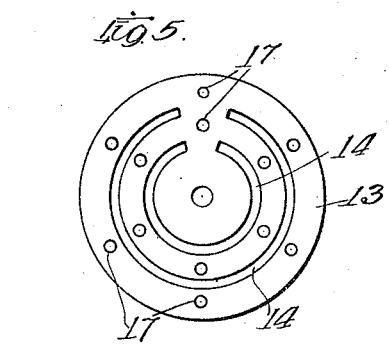
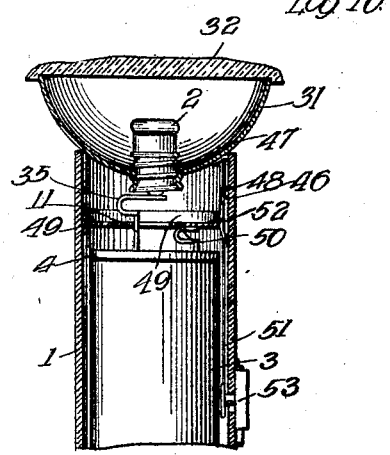
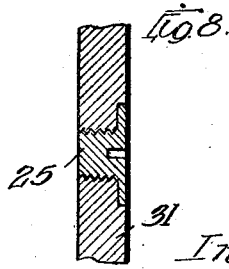
Inventor:
Hampton P. Rhodes
By Hill & Hill
Attys.
Witnesses:

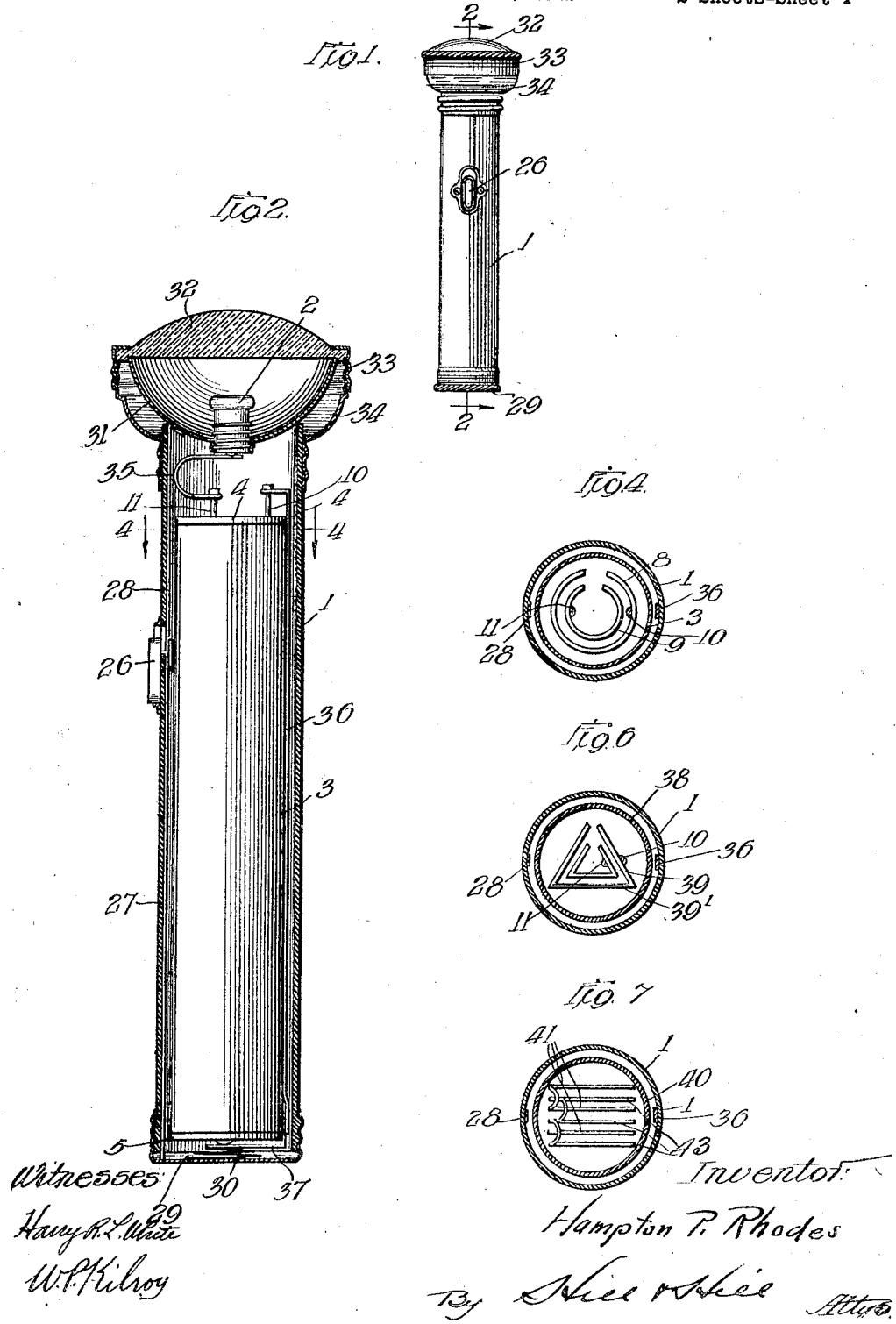

Patented Jan. 15, 1924.

1,481,226

UNITED STATES PATENT OFFICE.

HAMPTON P. RHODES, OF CHICAGO, ILLINOIS, ASSIGNOR TO RHOLITE MANUFACTURING COMPANY, OF CHICAGO, ILLINOIS, A CORPORATION OF ILLINOIS.

STORAGE BATTERY OR ACCUMULATOR.

Application filed October 5, 1922. Serial No. 592,566.

*To all whom it may concern:*

Be it known that I, HAMPTON P. RHODES, a citizen of the United States, residing at Chicago, in the county of Cook and State of Illinois, have invented certain new and useful Improvements in Storage Batteries or Accumulators, of which the following is a description.

My invention belongs to that general class of devices known as batteries, and relates particularly to an improved storage battery, or, as generally known in the trade,—accumulators.

The invention has among its objects the production of a battery of the kind described which is simple, compact, durable, inexpensive, efficient and satisfactory for use wherever found applicable. More particularly the same relates to a compact, durable battery, especially adapted for use in flash lamps or the like, in which dry cells are now generally employed.

The invention has among its further objects the production of a battery of the kind described for the uses set forth, which is particularly suitable for use with an improved electrolyte having regenerative properties, such as the electrolyte heretofore placed on the market under the name of rholite or hydrolite, but the use of the battery is not confined to any particular kind of electrolyte or particular grid composition.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a view in elevation of a type of flash lamp adapted to contain my improved battery;

Fig. 2 is a sectional view through the same illustrating a battery inserted for use;

Fig. 3 is an enlarged sectional view of a portion of the battery;

Fig. 4 illustrates the arrangement of plates or grids;

Fig. 5 illustrates a spacer plate;

Fig. 6 illustrates a modified type of plate, and

Fig. 7 illustrates another modified arrangement.

Fig. 8 is a sectional view of a portion of the container illustrating a modified construction;

Fig. 9 is a view similar to Fig. 5 illustrating a spacer plate for a modified arrangement of grids; and Fig. 10 is a sectional view illustrating a modified arrangement of casing and switch.

Referring to the drawings, in which the preferred embodiment of the invention is shown, 1 represents a casing or container of the desired size, shape and material, this varying to a large extent in various models or types of flash lamps,—some being cylindrical, as in the type shown, others being box shape, and various other shapes. These casings are usually made of rubber, fibre, or often metal, in which latter case there is generally an insulating lining, and are provided with a lamp socket, reflector, lens and cap, the usual dry cell being adapted to be slipped in the casing and being maintained in place by the cap, the same being so constructed as to close the circuit which may be controlled by the switch. It may be mentioned that the casing shown herein is merely illustrative and may be varied in many details, my improved battery being particularly adapted for use in flash lamps generally of the kind referred to, and I have shown one only type of flash lamp in which my battery is interchangeable with the usual dry type of battery now on the market.

Referring to the drawings, 2 represents the little lamp which it is desired to provide with electrical energy for lighting purposes, arranged to be operatively connected with the poles of the battery.

My improved battery consists of a shell or container 3 of the desired material, for instance rubber or a composition and of suitable size, shape and design to fit the particular outside container or flash lamp casing, as it may be termed, the design of the container 3 depending, of course, on the design of the flash lamp for which the battery is intended. The casing is provided with end closures 4 and 5, suitably constructed to provide a leak-proof container, one closure of which is generally preferably removable. In the particular construction shown both end closures are removable, but, as will be obvious from the disclosure hereinafter given, only one need be made removable, and, in fact, in some cases while the closure may be separable for assembling, it may thereafter be sealed in place so that to all intents and purposes it is a part of the container and not thereafter removable, except by the manufacturer or repair man.

I have shown both closures 4 and 5 threaded into the casing or shell part 3, and, if desired, gaskets or packing 7, of suitable material, may be employed. In this case one of the closures preferably the lower or bottom one 5, is made so that it may be removed.

Arranged within the container are the desired number of positive and negative plates 8 and 9 arranged as desired. These plates are provided with binding posts 10 and 11, which project at any desired point to the exterior of the casing, as shown, through the closure 4, and they may be of any suitable composition, generally in the shape of suitably formed grids provided with the necessary paste, similar to any of the well-known types of storage batteries. They may be maintained in proper spaced relation by spacing plates 12 or 13, or equivalent means for the purpose, which, when employed, may be formed with grooves or recesses 14, so that they will engage the plates and maintain them in desired relation to each other and prevent their being displaced in the container. Any suitable means may be employed at the binding post to prevent leakage at this point, for example metal inserts, such as lead or the like 15, may be imbedded or otherwise secured to the plate 4 and thence soldered, brazed or "burned" as it is termed, to the post, forming a substantially leak-tight joint.

The receptacle may be filled with electrolyte, or the electrolyte removed by removing the end closure, for example the closure 5, and thence lifting off the plate 13 and removing the old electrolyte and pouring in more. However, if desired, the closure 5 may be provided with an opening 16, normally closed by a plug 20, and in this case I prefer to provide openings 17 through the spacer plate 13. Likewise, the spacer plate and the closure or either may be raised or dished, as indicated at 18 and 19 respectively. The plug may be provided with a gasket 21, if desired.

I have shown a small plug 22 imbedded in the plug 20, the same being provided with a slot for the insertion of a screw driver or like tool, the part 22 being seated in the plug so that it will not turn therein, but will turn with it. Where the plug 20 or its equivalent is provided I generally prefer to provide a locking pin or plug 23, which will prevent the closure 5 from being accidentally removed by removing the plug 23. However, the closure 5 may be screwed off and removed. For this purpose, I generally prefer to knurl the ends of the closure 5, but this is not essential. If preferred, however, the plug 20 may be placed at some other part of the container, for example, referring to Fig. 8, a plug 25 might be placed in the wall 3' corresponding to the wall of the container or in closure 3.

As before mentioned, the particular battery shown is constructed to be useable in place of the dry batteries for the well-known types of flash lamp casings. Consequently, additional conductors are provided which would not be generally employed where a specially designed casing was employed.

Referring particularly to Fig. 1, 26 represents any type of switch mounted on the casing, and 27 and 28 part of the electrical circuit. Conductor 28 is shown as connected on the reflector 31, which is maintained in place by the lens 32, 33 being the usual retaining cap for holding the lens and reflector in place. Generally in lamps of this construction the lens may be removed for the purpose of renewing the lamp, and in the particular device shown the reflector is formed with a socket for carrying the lamp 2 and forms a part of the circuit. With the usual form of dry battery, conductor 27 is in electrical contact with the closure 29. This connects through a spring 30 with the bottom of the adjacent dry battery. With my particular construction, in order to utilize the type of casing shown, I extend a conductor 26 from the post 10 down to the opposite end of the battery, and this is provided with an extension 37 extending to a point where it may be engaged by a spring 30. Where the closure 5 is made removable, 36 and 37 should be separable to permit removal of the closure. If desired, the same may extend over to the member 22, which may form a contact for engagement with the spring 30. The opposite post 11 or pole of the battery may be connected in any suitable manner, for example by a conductor 35, to the other contact of the lamp 2 so that when the battery is inserted and the switch 26 is closed there is a complete circuit formed through the lamp, which may be opened or broken at will by manipulating the switch.

The battery may be removed from the casing at any time by removing the closure 29 at the bottom of the casing, and the old electrolyte may be drawn out, either by removing the closure 5 or the plug 20, or in an equivalent manner, for example by removing a plug similar to 25, shown in Fig. 8, so that the battery may be refilled or charged.

Generally it has been customary to recharge storage batteries by subjecting the same to a charging current, and this may be done with the present battery. However, when my improved electrolyte is used, which is not necessary to describe in detail herein, this electrolyte has the peculiar characteristic that a discharged battery may be regenerated or charged by removing the old electrolyte and putting in my new electrolyte, whereupon the battery is given additional life. This may be continued from time to time, as often as necessary and as often as the electrolyte will revive the battery. One of the advantages of dishing or raising the spacer 13, or the closure 5, or either of them, as indicated in Fig. 3 at 18 and 19, is that all of the electrolyte may be withdrawn from the battery and new added without difficulty when the plug is removed.

The lamp may be handled similar to a lamp equipped with dry batteries, the only difference being that a more brilliant and dependable light is obtained by virtue of the stronger battery and that the same has a considerably longer life. The same, by using my improved electrolyte, may be recharged from time to time at a considerably less expense than repurchasing new dry batteries. Consequently, the device is more economical in so far as upkeep is concerned. As was before mentioned, it is immaterial as to the particular shape or size of the battery, this depending upon the use to which the same is to be put and the plates may be arranged in any desired manner. These may likewise be of the desired, size, shape and material. In Fig. 6, a slightly modified form of plate is shown, in which 1 represents the outer casing and 38 the battery container or cell, while 39 and 39′ represent the plates.

In Fig. 7, 1 represents the outer casing, 40 the cell or container, and 41 and 43 the plates, arranged similar to plates in larger storage batteries. These figures are merely illustrative of some of the possible arrangements. While the battery described is of the smaller type, the same special features may be embodied in batteries of larger size, the battery shown, however, is particularly adapted for small work, including lanterns, as well as flash lights, and it will be noted that the same may be inverted, laid down, or handled, similar to an ordinary dry battery lamp.

As before mentioned the casing previously described is a more or less standard type of device. Where the casing is made particularly for a battery similar to mine, the switch mechanism may be modified and the parts somewhat simplified. For purposes of illustration I have shown in Figure 10 how the casing may be modified so that it is only applicable for my type of battery or a battery of a similar type. Referring to this figure, 46 represents a casing corresponding to the casing 1, and 3 the battery. 47 represents the reflector which may be similar to the other one described, and 48 a conductor connected therewith. 49 represents a conductor arranged to contact with one of the holes 50 of the battery. 51 represents a switch member arranged with the end 52 adapted to bridge over and connect the contact members 48 and 49, the same being operable by means of a switch button 53 or equivalent means.

Obviously, where the contact 49 is arranged in the form of a ring, the battery need not be slipped in the casing in any particular manner in order to make contact, as merely pushing it in the casing and screwing on the end cap (not shown) and a turn of the battery will contact with 49. Obviously moving the switch member 52 will open and close the switch between 48 and 49 and control the light.

One of the advantages of the construction is that the battery cell or container is entirely sealed and it may be mentioned that with my improved electrolyte this is possible, as very little gas, if any, is generated, at least not enough pressure results to cause any material damage.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a battery of the kind described and in combination, a casing provided with end closures, battery plates in said casing, retainer plates intermediate the ends of said plates and their adjacent end closures for holding said battery plates spaced apart throughout and spaced from the casing wall, and means for permitting the filling of the spaces between said casing and battery plates with an electrolyte.

2. In a battery of the kind described and in combination, a casing provided with end closures, battery plates in said casing, retainer plates intermediate the ends of said plates and their adjacent end closures for holding said battery plates spaced apart throughout and spaced from the casing wall, and removable means for permitting the filling of the spaces between said casing and battery plates with an electrolyte.

3. In a battery of the kind described and in combination, a casing provided with end closures, battery plates in said casing, retainer plates intermediate the ends of said plates and their adjacent end closures for holding said battery plates spaced apart throughout and spaced from the casing wall, all of said spaces being in communication with one another and means for permitting the filling of the spaces between said casing and battery plates with an electrolyte.

4. In a battery of the kind described and in combination, a casing provided with end closures, battery plates in said casing, retainer plates having their peripheral edges snugly engaging the casing wall and arranged intermediate the ends of said plates and their adjacent end closures for holding said battery plates spaced apart throughout and away from the casing wall, and means for permitting filling the spaces between said casing and battery plates with a liquid electrolyte.

5. In a battery of the kind described and in combination, a casing provided with end closures, battery plates in said casing, retainer plates having their peripheral edges snugly engaging the casing wall and arranged intermediate the ends of said plates and their adjacent end closures for holding said battery plates spaced apart throughout and away from the casing wall, one of said retainer plates and end closures having a chamber formed therebetween, ducts leading from said chamber to all of said spaces, and means for permitting the filling through said chamber with a liquid electrolyte.

6. In a battery of the kind described and in combination, a casing provided with end closures, battery plates in said casing, retainer plates intermediate the ends of said plates and their adjacent end closures having battery plate-receiving grooves therein for holding said battery plates spaced apart throughout and spaced away from the casing wall, there being a chamber provided between the opposed surfaces of one of said retaining plates and its adjacent end closure, and means opening into said chamber from the exterior of the battery for permitting the filling of the spaces between said casing and battery plates with an electrolyte.

7. In a battery of the kind described and in combination, a casing provided with end closures, battery plates in said casing, having contact terminals extending therebeyond, retainer plates intermediate the ends of said plates and their adjacent end closures for holding said battery plates spaced apart and spaced away from the casing wall, a chamber provided between the opposed surfaces of one of said retaining plates and its adjacent end closure, said last-mentioned retaining plate provided with openings therethrough on opposite sides of said battery plates, and means opening into said chamber from the exterior of the battery for permitting the filling of the spaces between said casing and battery plates with an electrolyte.

8. In a battery of the kind described and in combination, a casing provided with end closures, battery plates in said casing, retainer plates intermediate the ends of said plates and their adjacent end closures and in engagement with said closures for holding said battery plates spaced apart throughout their opposed surfaces and spaced away from the casing wall, the opposed surfaces of one of said retainer plates and its adjacent end closure cut away to provide a chamber, and means leading into said chamber from the exterior of the battery for permitting the filling of the spaces between said casing and battery plates with an electrolyte.

9. In a battery of the kind described and in combination, a casing provided with end closures, one of said closures being removably secured in said casing and having an opening therethrough, battery plates in said casing and having contact terminals extending therebeyond, retainer plates snugly engaging the casing wall and arranged intermediate the ends of said battery plates and their adjacent end closures for holding said battery plates spaced apart throughout their length and spaced away from the casing wall, said removable end closure and its adjacent retainer plate having a chamber formed therebetween, said retainer plate having apertures therethrough on opposite sides of the battery plates, closure means removably positioned in the opening in the removable end closure for normally sealing said opening, but permitting the filling therethrough with a liquid electrolyte.

In testimony whereof, I have hereunto signed my name in the presence of two subscribing witnesses.

HAMPTON P. RHODES.

Witnesses:
 Roy W. Hill,
 Ruth M. Ephraim.